(12) United States Patent
Bestler et al.

(10) Patent No.: US 9,778,037 B2
(45) Date of Patent: Oct. 3, 2017

(54) SCANNER FOR SPACE MEASUREMENT

(71) Applicant: HEXAGON TECHNOLOGY CENTER GMBH, Heerbrugg (CH)

(72) Inventors: Simon Bestler, Langenargen (DE); Jochen Scheja, Heerbrugg (CH); Jürg Hinderling, Marbach (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 436 days.

(21) Appl. No.: 14/510,812

(22) Filed: Oct. 9, 2014

(65) Prior Publication Data
US 2015/0098075 A1   Apr. 9, 2015

(30) Foreign Application Priority Data
Oct. 9, 2013   (EP) .................................... 13187902

(51) Int. Cl.
*G01C 3/08* (2006.01)
*G01C 15/00* (2006.01)
*G01S 17/06* (2006.01)
(Continued)

(52) U.S. Cl.
CPC ......... *G01C 15/008* (2013.01); *G01C 15/002* (2013.01); *G01S 7/4808* (2013.01);
(Continued)

(58) Field of Classification Search
CPC ..... G01C 15/002; G01C 15/008; G01S 17/42; G01S 17/023; G01S 17/06; G01S 17/89;
(Continued)

(56) References Cited

U.S. PATENT DOCUMENTS 7,164,785 B2 * 1/2007 Logan ................... G06T 11/001
382/154
7,697,126 B2 * 4/2010 Farsaie .................... G01C 3/08
356/141.1
(Continued)

FOREIGN PATENT DOCUMENTS

CN    101852857 A    10/2010
CN    103221975 A    7/2013
(Continued)

OTHER PUBLICATIONS

European Search Report dated Jul. 15, 2014 in application No. 13 18 7902.

*Primary Examiner* — Mark Hellner
(74) *Attorney, Agent, or Firm* — Maschoff Brennan

(57) ABSTRACT

Some embodiments of the invention relate to a surveying apparatus in the form of a scanner comprising a beam deflection unit, such a beam deflection unit and a measuring method to be carried out with said surveying apparatus. The surveying apparatus comprises a radiation source for generating measurement radiation and a detector for receiving reflected measurement radiation, called reflection radiation for short, which was reflected at an object of interest, wherein measurement radiation and reflection radiation have substantially the same optical path. Situated in said optical path there is a beam deflection unit mounted rotatably about a rotation axis and serving for adjustably aligning the measurement radiation and for capturing the reflected radiation.

13 Claims, 7 Drawing Sheets

(51) Int. Cl.
*G01S 17/02* (2006.01)
*G01S 17/42* (2006.01)
*G01S 7/48* (2006.01)
*G01S 7/481* (2006.01)
*G01S 7/497* (2006.01)
*G01S 7/51* (2006.01)
*G01S 17/89* (2006.01)

(52) U.S. Cl.
CPC .......... *G01S 7/4813* (2013.01); *G01S 7/4817* (2013.01); *G01S 7/4972* (2013.01); *G01S 7/51* (2013.01); *G01S 17/023* (2013.01); *G01S 17/06* (2013.01); *G01S 17/42* (2013.01); *G01S 17/89* (2013.01)

(58) Field of Classification Search
CPC .... G01S 7/4808; G01S 7/4817; G01S 7/4972; G01S 7/51; G01S 7/4813
USPC ....................................................... 356/3.01
See application file for complete search history.

(56) References Cited

U.S. PATENT DOCUMENTS

| | | |
|---|---|---|
| 8,294,769 B2 | 10/2012 | Otani et al. |
| 2005/0279914 A1 | 12/2005 | Dimsdale et al. |
| 2006/0197867 A1* | 9/2006 | Johnson ............... F16M 11/10 348/373 |
| 2010/0134596 A1 | 6/2010 | Becker |
| 2013/0235165 A1 | 9/2013 | Gharib et al. |
| 2014/0009604 A1 | 1/2014 | Hinderling et al. |

FOREIGN PATENT DOCUMENTS

| | | |
|---|---|---|
| DE | 10 2012 105027 A1 | 1/2013 |
| EP | 20 2006 005 643 U1 | 7/2006 |
| EP | 2 523 017 A1 | 11/2012 |
| EP | 2 620 746 A1 | 7/2013 |

\* cited by examiner

SCANNER FOR SPACE MEASUREMENT

FIELD OF THE INVENTION

The invention relates to a surveying apparatus, in particular in the form of a scanner, for generating true-to-scale three-dimensional imagings of surveyed objects of interest.

BACKGROUND

Surveying apparatuses or scanners of the type mentioned in the introduction are designed to survey a spatial region and/or an object three-dimensionally. Typical applications include, for example, the surveying of interiors, such as churches and factory buildings, large objects, such as buildings or aircraft, or else the forensic surveying of an accident site.

In order to survey these objects, by means of a laser scanner, a predefined spatial volume is scanned with a laser beam and the laser light reflected from the object is detected, wherein the angle information for the direction of the emitted laser beam and of the detected laser light is acquired for each instant. By means of the detected laser light, the distance between a surface point situated in the spatial volume and the measuring apparatus can be determined by triangulation and/or time-of-flight measurement or phase shift. Together with the angle information associated with said surface point, it is possible to calculate the spatial position of said surface point. From the sequence of measurement points recorded in this way, or the positions in space calculated therefrom, a three-dimensional model of the scanned surface, of the object or of the scanned environment is generated by corresponding software, e.g. in the form of a three-dimensional point cloud.

In many cases, besides this purely geometrical acquisition of the surfaces in the spatial volume, a photographic acquisition by means of a camera is also carried out. An overview camera simply fitted on the surveying apparatus was initially used for this purpose. The basic principles of such a scanning surveying apparatus with camera are explained in DE 20 2006 005 643 U1.

Modern surveying apparatuses of this type generally have a measuring camera arranged alongside the radiation source and the detector for the reflected radiation in the housing of the surveying apparatus or scanner (on-axis measuring camera). By means of corresponding optical deflection devices, the field of view of such a camera can be aligned for example coaxially with respect to the measurement beam optics or parallel thereto. The acquired image can be represented on a display of the display control unit of the surveying apparatus and/or on the display of a periphery device used for remote control—such as a data logger, for example. However, rotations that the captured image exhibits on account of the deflection of the camera field of view at the beam deflection unit first have to be corrected computationally prior to representation, for which reason real-time representations cannot be realized.

For capturing relatively large spatial volumes, the integrated camera generally captures a plurality of images that are subsequently combined by corresponding software to form a single image in the sense of a "panoramic image". Such photographic images captured in parallel with the scanning allow at least the identification of different brightness or color values of the scanned surfaces. Besides the visual overall view, under certain circumstances further information, e.g. regarding the surface texture, can also be obtained therefrom.

What is disadvantageous about these surveying apparatuses is that as a result of the partly common optical path of camera and measurement radiation/reflection radiation, either the optical path of the measurement radiation/reflection radiation is impaired by constituents of the camera optics, or conversely the optical path of the measuring camera is impaired by measurement radiation/reflection radiation or optical components or the paths thereof. The optical construction of such surveying apparatuses is complicated and expensive, and indeed it requires the coupling-out of defined light components from the common optical path. Furthermore, for panoramic recordings captured by such surveying apparatuses, the individual images of which the panoramic recording is composed have to be processed by corresponding software in a complicated manner, since, by virtue of the stationary photosensitive sensor (CMOS, CCD) of the camera in interaction with the field of view rotating about two axes, the individual images are captured in a manner rotated by different angles in each case.

EP 2 620 746 A1 presents a surveying apparatus comprising a laser scanning unit for surveying and representing objects or the environment in the form of point clouds, said apparatus having an overview camera alongside an on-axis surveying camera. The overview camera has an overview field of view, which is larger than the field of view of the on-axis measuring camera, such that the area of the terrain acquired by the overview camera is larger than that acquired by the measuring camera. The overview camera therefore enables a better orientation and faster targeting of a desired point. It is therefore used primarily for the orientation in space. The overview camera can be accommodated in the measuring head and have a field of view with fixedly defined alignment in a manner similar to the overview camera from DE 20 2006 005 643 U1 already mentioned above, or else the overview camera is arranged on the exterior of the beam deflection unit and its overview field of view, like the field of view of the on-axis measuring camera, is likewise alignable by means of the beam deflection unit. What is advantageous here is that not only the field of view but also the photosensitive sensor rotates about the two axes. For this purpose, the beam deflection unit is provided with an optical channel that connects the overview camera arranged on the beam deflection unit to the rear side—embodied in a reflective fashion—of the deflection element via corresponding optical elements and enables the overview camera to have a view rotated by 180° with respect to the field of view of the on-axis measuring camera and with respect to the alignment of the measurement radiation. The construction with the overview camera on the exterior of the beam deflection unit has various disadvantages: firstly, it is necessary to provide two cameras and two optical paths for the fields of view of the cameras. Secondly, the positioning of the overview camera on the exterior of the beam deflection unit causes considerable unbalance and bending moments on the beam deflection unit, which have to be combated by corresponding countermeasures, which causes additional costs and makes the system susceptible to faults in field operation.

DE 10 2010 105027 A1 discloses a laser scanner comprising a camera, which, instead of being arranged on the exterior of the beam deflection unit, is arranged in the beam deflection unit, in the space behind the deflection mirror. An optical deflection element is additionally arranged in the space behind the deflection mirror and diverts the field of view of the camera in such a way that it is aligned from the camera lens into the environment via a window in a wall of the beam deflection unit in a manner rotated by 180° with respect to the alignment of the emitted measurement beam.

Therefore, the camera always looks in exactly the opposite direction in relation to the emitted measurement beam. The manner in which the beam deflection unit and the camera are specifically configured, whether as overview camera having a large field of view or as measuring camera having a smaller field of view, and the manner in which the camera and the optical deflection element are fixed in the beam deflection unit are not disclosed in DE 10 2010 105027 A1.

Although the cameras concomitantly rotating with the beam deflection unit, as disclosed in DE 10 2010 105027 A1 and EP 2 620 746 A1, solve the problem of the rotated images that arose in the previous on-axis cameras as a result of the rotation of the camera field of view relative to the stationary camera sensor, real-time recordings are still not available to the user. The calibration of such an apparatus also remains time-consuming and has to be performed by the manufacturer. A subsequent calibration on site is virtually impossible. When determining the spatial coordinates taking account computationally of the system-inherent faults, such as tilting axis skew, etc., it is still necessary to use complex algorithms by means of which the viewing direction of measuring camera and measurement radiation rotated by 180° with respect to one another can be taken into account when determining the spatial coordinates.

SUMMARY

Therefore, some embodiments of the present invention may provide a surveying apparatus of the type mentioned in the introduction with camera, which surveying apparatus opens up a greater/more flexible range of use and avoids the disadvantages described above.

A surveying apparatus according to the invention, in particular a scanner, for optically surveying an environment by scanning emission of measurement radiation comprises a housing mounted on a base rotatably about a base axis, wherein a radiation source for generating measurement radiation and a beam optical unit for guiding the measurement radiation out of the housing are accommodated in the housing. The beam optical unit also serves for forwarding reflected measurement radiation returning from the environment as reflection radiation from a scanned object onto a detector situated in the housing, wherein measurement radiation and reflection radiation at least partly have a common optical path. In the common optical path provision is made of a beam deflection unit mounted in the housing rotatably about a rotation axis and serving for the adjustable, directional emission of the measurement radiation (target axis) into the environment and for capturing the reflection radiation from the environment (scanning direction). Furthermore, the surveying apparatus comprises a measuring camera for capturing photographic images of the environment to be scanned or the scanned environment, said measuring camera being integrated into the beam deflection unit and in particular into a rotation body of the beam deflection unit, such that it concomitantly rotates with the beam deflection unit upon a rotational movement of the beam deflection unit about its rotation axis. The measuring camera has a field of view and is equipped and arranged in the rotation unit in such a way that its field of view is aligned in the same direction as the measurement radiation emitted into the environment by a beam deflection element of the beam deflection unit. Moreover, provision is made of a processing and control unit for data and image processing and for control of the surveying apparatus.

The measuring camera can be integrated into the beam deflection unit particularly simply if the beam deflection unit has in its rotation body a cutout into which the camera can be inserted, or if the rotation body is embodied as a hollow body. Unbalance and bending phenomena that can otherwise occur are thus reduced to a minimum or completely avoided, as are complicated optical field of view deflections. This allows a simpler and thus more cost-effective configuration of the surveying apparatus.

The alignment of the camera with its field of view in the direction of the measurement radiation allows photographic images of the object to be surveyed or of the environment to be surveyed to be captured in each case simultaneously with the alignment of the measurement radiation with the object or into the environment. Real-time recordings of the object currently being surveyed are thus possible. The for the alignment and acquisition of the data necessary for the determination of the spatial coordinates of a target point, namely the acquisition of two angular coordinates and of the distance of the target point, require less time as a result of this measuring construction because alignment and acquisition of all data including distance can now be carried out simultaneously. Since the alignment of the apparatus for capturing a photographic image (alignment of the camera) and the acquisition of the angular coordinates and of the distance (alignment of the measurement radiation) are the same, the algorithms for taking account of system faults, such as tilting axis skew, faults in the collimation axis, etc., are also simplified. The correct assignment of pixels of an image captured photographically by the camera to three spatial coordinates of a target point is simpler and requires less computing power in conjunction with reduced susceptibility to faults. Overall, therefore, simpler software can be employed and less computing power is required. All functions of previous on-axis measuring cameras, that is to say of measuring cameras such as hitherto were usually incorporated into scanning surveying apparatuses, can also be performed with a measuring camera as proposed.

The advantages indicated are afforded both with a measuring camera which is integrated into the beam deflection unit and whose field of view is aligned with a lateral offset in the same direction as the measurement radiation emitted into the environment by the beam deflection element of the beam deflection unit, and—in an even better way moreover—with a measuring camera whose field of view is aligned coaxially in the same direction as the emitted measurement radiation.

For the alignment of the field of view coaxially in the same direction with the measurement radiation, the measuring camera is advantageously arranged on the rear side of the beam deflection element in the rotation body, wherein the beam deflection element is embodied as a dichroic beam splitter, in particular as a dichroic mirror, which deflects substantially only the wavelength of the measurement radiation and is transparent to other wavelengths. The camera is then advantageously arranged with its lens in the same direction with the emitted measurement radiation and coaxially with respect thereto behind the beam splitter.

However, what is also likewise conceivable, of course, is an arrangement of the camera with the lens aligned in the direction of the measurement radiation but with a slight offset with respect thereto, e.g. if the space conditions or unbalance do(es) not allow a coaxial arrangement. With a slight offset, however, the camera can also be fixed in the rotation body with the lens in the direction of the measurement radiation in or on the rotation body wall, wherein the camera is fixed either in/on the beam-side wall or the opposite wall and the field of view extends through an opening in the rotation body wall.

The local, instrument-linked coordinate system of a scanner is described by parameters such as angle deviations and offsets of the rotary and target axes. Important calibration parameters include: tilting axis skew, the horizontal and vertical erroneous angles of the laser targeting direction, the angle error and the position of the deflection element or rotary mirror, the skew of the rotary axis (designated here generally as rotation axis) with respect to the vertical axis (designated here generally as base axis), etc. On account of its complex internal optomechanical construction and the arrangement of the laser beam elements, the calibration of a scanner in accordance with the prior art is very demanding. Therefore, the determination of these parameters is ascertained initially prior to delivery of the apparatus by means of a factory calibration, for example on the basis of a two-position measurement, as described in EP 2 523 017 A1.

A fast, efficient field calibration on the basis of a two-position measurement is not possible with the previous scanners, and so hitherto it has not been possible for the user of the apparatus to determine the present parameters on site. Although instructions and mathematical models for calibration can be found in the literature, they are provided for apparatus constructions which generally do not correspond to the realized optomechanical construction of the scanner present, such that they are unusable for precisely determining the coordinate system of said scanner. If the coordinates of reference points are not known beforehand and if only one data set of a two-position measurement from a single instrument installation is present, then the desired parameters cannot be determined by means of the models provided in the literature. Without position information of the reference or target points, the compensation problem in the evaluation of a data set from a two-position measurement is singular, and the calibration parameters are not fully determinable.

With the optical camera accommodated in the rotation unit of the scanner, a calibration on the basis of a two-position measurement can now be carried out in a new way even in a manner based on freely chosen fixed points, without the absolute or relative coordinates thereof having to be known. That is to say that it is possible to choose arbitrary reference points for the two-position measurement. The compensation problem assigned for determining the calibration parameters is regular and thus solvable. The user of the apparatus according to the invention therefore now has the possibility of determining all necessary parameters with sufficient accuracy himself/herself, specifically at any time and also on site, in the field. In other words, said user also has the possibility of checking the parameters and, if appropriate, determining them anew if changes in the parameters arise during field use on account of weathering influences (change in temperature, changes in moisture, etc.), or when the apparatus is used over a relatively long period of time (apparatus heating).

Since the measuring camera integrated into the beam deflection unit rotates concomitantly therewith, the errors of the measuring camera in the horizontal collimation and in the vertical index and also the determination of the tilting axis skew can be determined in an automated manner and the measuring camera can be calibrated with respect to the axial system of the measuring instrument in an automated manner (tilting axis and rotation axis are synonymous with one another here). In this case, either it is possible that only the error determination is automated and the sighting, in particular the second sighting of a reference point, takes place manually, or alternatively it is possible that the second sighting of the reference point, i.e. rotation of housing and rotation body, likewise takes place in an automated manner by means of motors.

For this purpose, a target object is captured a first time by means of the measuring camera under a known angular position; the housing is rotated 180° about the base axis and the camera in the rotation unit is rotated by 180° about the rotation axis and the target object is captured another time by the measuring camera. The images thus obtained are made to coincide and deviations of significant image points in the recordings are used to determine deviations of the rotation axis and of the base axis from the horizontal and vertical, respectively, and to correspondingly calibrate the apparatus or the measuring camera. Since there are no image rotations that have to be extracted computationally with the aid of an algorithm, as was previously the case with on-axis cameras, systematic errors and errors possibly caused by the algorithm are avoided.

With the already calibrated measuring camera, it is then possible to calibrate the position of the laser beam of the scanning unit in relation to the axial system: if the camera errors relative to the rotation axis 4 and the base axis 11 are known by means of 2-position measurement, a scan of the same object can be produced for a calibration of the laser. If the position of significant features of the object in the point cloud generated from the scan is then compared with the position of the same significant features of the camera recording, the laser can be calibrated on the basis of the deviations determined therefrom.

For special precision demands, the target object can additionally be scanned with the laser from at least two positions, wherein the significant points in one point cloud are then compared with those of the other point cloud and related to the corresponding points in the photographic recordings of the camera.

Instead of one or a plurality of 2-position measurements of an object with significant features, it is also possible to perform one or a plurality of 2-position measurements of a reflector and then to perform a single-point measurement of the reflector instead of a scan, in order to calibrate camera and laser. In the service situation, the surveying apparatus can be adjusted and calibrated by means of already available adjustment tools from geodesy. This calibration is possible independently of the camera used, its optics or capture technology (see further below).

With the measuring camera which is integrated into the beam deflection unit and rotates concomitantly therewith and whose field of view is additionally aligned in the same direction as the measurement radiation, for determining the errors in the horizontal collimation and in the vertical index it suffices to employ a single, arbitrarily selectable reference point. If the error of the tilting axis skew is also intended to be determined, a second reference point in oblique line of sight is required, that is to say a reference point lying within a horizontal angle and vertical angle range of approximately 30° to 160° relative to the initial position of the surveying apparatus (normal configuration of the surveying apparatus: 0° corresponds to alignment of the measurement radiation vertically upward; 90° corresponds to measurement beam alignment horizontally).

That means that a calibration of the surveying apparatus on site can now also be carried out. The calibration on site is effected by means of 2-position measurement, wherein the complete calibration (errors in the horizontal collimation, in the vertical index and the tilting axis) is carried out with the aid of two reference points, wherein one reference point or else both reference points can be selected arbitrarily. The coordinates of the one arbitrarily selected reference point or of both of the arbitrarily selected reference points are then determined only when the 2-position measurement is carried out. This considerably increases the flexibility and the possibilities for use of the surveying apparatus.

A display is particularly advantageously provided in the surveying apparatus, said display being connected to the measuring camera and/or an image memory of the measuring camera in such a way that images that can be captured by the camera (live images) and/or photographic images already captured can be represented on the display. In one advantageous development of the apparatus, it is possible to superimpose a reticle on the images represented on the display, such that the measuring camera can be used for sighting targets in a simple manner.

In this application, reticle denotes all types of targeting markings which facilitate the accurate sighting of a target and such as are known in a wide variety of variants from the prior art, e.g. as targeting aids from weapons technology (graticule), from geodesy or else from seafaring, for example.

Particularly advantageously, the rotation body is embodied as a hollow body and the measuring camera is arranged axially with respect to the rotation axis in the rotation body of the beam deflection unit. In this case, it is advantageously connected either fixedly to the rotation body or else fixedly to the drive shaft—extending concentrically with respect to the rotation axis—of the rotation body of the beam deflection unit, such that it rotates concomitantly therewith. The beam deflection element is then embodied as a dichroic beam splitter which deflects substantially only the wavelength of the measurement radiation and is transparent to other wavelengths and the field of view of the camera is aligned via the dichroic beam splitter and correspondingly optical deflection elements either with an offset, but particularly advantageously coaxially in the same direction as the measurement radiation. The structural space available in the axial direction as a result of the rotation body embodied as a hollow body allows the use of larger camera optics than would be allowed by incorporation of the camera into the same cavity but perpendicularly to the rotation axis. By virtue of this specific type of camera incorporation, therefore, the range of use of the measuring camera and thus of the surveying apparatus itself becomes more flexible and greater. Moreover, at this position the camera is more easily connectable to the spaces outside the rotation body with regard to energy supply and/or data transfer, for example by means of a sliding contact or by means of a bushing in the shaft.

It would likewise be conceivable here, of course, to implement an alignment of the field of view by means of deflection elements in the same direction with the measurement radiation but with an offset through a window in the wall of the rotation body.

A lightweight camera is advantageously used as the measuring camera, which has a low energy demand.

In order to be able to capture images at different distances, the measuring camera advantageously has a digital zoom. However, a miniaturized mechanical zoom, such as is known from cellphone cameras, or focusing by means of one or a plurality of lens elements deformable in a controlled manner is also conceivable.

However, it is also conceivable to integrate two measuring cameras having different focal lengths into the beam deflection unit: one measuring camera for near-field recordings and one measuring camera for far-field recordings. It is possible, of course, for each of these two measuring cameras to be equipped with a zoom for their respective capture range.

Depending on the requirement made of the surveying apparatus, different camera concepts are advantageously used, such as, for example, light field cameras, also referred to as plenoptic cameras, such as are sold by "Reytrix", for example, and with which, in conjunction with rigid optics, virtually arbitrarily focusable images can be generated. Cameras with manually adjustable focus and/or with autofocus function can be used. The use of cameras having lens elements deformable in a targeted manner, such as polymer lens elements or liquid lens elements, whose focal length and—in the case of liquid lens elements—whose wedge are adjusted dynamically by actuators, can advantageously also be used as the measuring camera.

The use of an RIM camera (Range Imaging Camera) allows a first coarse 3D point cloud recording of a region to be generated before this region or a partial region thereupon selected is scanned precisely by means of the scanning unit.

Furthermore, the use of a thermal imaging camera, also referred to as a thermographic camera, in combination with 3D recordings for houses or industrial installations enables the unambiguous identification—since it also extends into the depth—of heat sources or heat leaks, which can then e.g. also be compared with setpoint values in a BIM or CAD.

The use of a high-resolution one-dimensional line camera is also conceivable, wherein this camera is preferably arranged in the rotation body with its pixel line aligned parallel to the rotation axis, since this enables a good assignment of the pixels to the spatial coordinates. When the line recordings are joined together to form an overall image or during exposure control in interplay with the control of the rotational movement, the precise angle measurement in the horizontal and vertical directions that is available in such an apparatus plays an important part.

The resolution of the captured images is preferably implemented in an angularly resolved fashion. Whereas in a conventional camera chip the pixels are arranged in a plane, in a high-resolution line camera the pixels are arranged linearly only in one dimension and can thereby be packed much more densely. As a result, the image resolution is generally much better in line cameras than in CCD cameras and the images captured by such cameras can generally be read out and processed much faster. If the line camera described is rotated—preferably about the rotation axis with a constant base axis—a two-dimensional all-round image of the surrounding space arises. By way of example, a 20 kpix camera can generate a 360° all-round image with a resolution of 400 Mpix in a very short time. For capturing such an image, a rotation by 360° about the rotation axis takes approximately 4 s, for example, wherein the light sensitivity of the camera sensors should be taken into account; the greater the light sensitivity of the camera sensors, the shorter the exposure times and the faster the creation of the recording.

Given a sufficiently short exposure time, it is possible to capture high-resolution moving images (small films) as real-time recordings over the space that can be acquired preferably by rotation about the rotation axis, which can be used very advantageously particularly in the case of construction site monitoring and/or for recognizing critical deformations in a timely manner.

In order to lengthen the exposure times with the same frame rate, it is possible to cause the rotation axis to effect a superimposed rotational oscillation in addition to the rotation about its rotation axis. In this case, an image is respectively captured at the instant of the speed reversal. The natural oscillation of the system is used for the rotational oscillation. In this case, the system generally comprises the beam deflection unit with the rotation body carrying the camera, and at least one part of the shaft that drives the rotation body, and the motor that drives the shaft.

Another possibility for improving the exposure with the same frame rate consists in using stroboscopic flash lights. For good illumination, most advantageously, the stroboscopic lights are arranged concentrically relative to the camera optics and rotate concomitantly. In order to increase the flexibility with regard to the camera properties, it is possible to integrate a camera holder into the beam deflection unit, said camera holder serving for accommodating interchangeable cameras, e.g. having different focal lengths, different optics or different capture speeds or capture technologies (RIM camera, line camera, thermographic camera). Said camera holder can be integrated in the rotation body of a beam deflection unit that is designed to accommodate one camera or else to accommodate two cameras. Independently of whether one or more cameras are installed fixedly or integrated interchangeably in the rotation body, it is advantageous to provide, as the measuring camera integrated into the beam deflection unit, a camera from the following group of cameras: a far-field camera, a near-field camera, a camera with digital zoom, a camera with miniaturized mechanical zoom, a camera with manually adjustable focus, a camera with autofocus function; a camera with liquid lens element; a plenoptic camera, an HDR camera, an RIM camera, a high-resolution one-dimensional line camera, a high-speed camera or a thermal imaging camera or some other special camera.

In order to supply the measuring camera(s) with electrical energy, a power source, in particular a chargeable power source, is advantageously integrated into the beam deflection unit. Particularly advantageously, the chargeable power source is to function simultaneously as a balancing element for the beam deflection unit.

In order to be able to photographically record individual excerpts from the environment in a targeted manner by means of the measuring camera, an adjusting mechanism is advantageously provided in the housing of the surveying apparatus, by means of which adjusting mechanism the beam deflection unit is alignable together with the integrated measuring camera in a motor-controlled fashion and/or manually, in particular by means of rotary adjusting knobs, rotationally about the rotation axis and rotationally about the base axis. For manually targeting an excerpt, the live image on the display can advantageously be used.

As a special type of aid, an inclination sensor for measuring an inclination of the surveying apparatus relative to the gravitational vector can be provided in the surveying apparatus. The processing unit is then advantageously configured in such a way that a measured value for the alignment of the measurement radiation and/or a photographic image recording can be corrected depending on a measured inclination. This is particularly helpful if the measuring apparatus readily slips away or tilts during the measurement or image capture, e.g. owing to a soft support, or if it is not level from the outset, and the measured values and the associated photographic images are intended to be related to an external coordinate system.

In one preferred embodiment, the surveying apparatus has an individual-point measuring mode, within which a target point is sighted with the aid of the measuring camera, wherein the image of the sighted target acquired by the camera is preferably represented on a display and, in particular, can also be superimposed with a reticle. Moreover, in the individual-point measuring mode, the distance to the target point and the angular coordinates of the target point are automatically acquired and the spatial coordinates of the target point are ascertained therefrom. In this case, the angular coordinates can be ascertained from the angle data recorded by the angle encoders of the rotation axis and the base axis during the alignment of the measuring camera with the target point. Of course, all embodiments whose integrated measuring camera has an optical axis aligned coaxially with the optical axis of the measurement radiation can be used particularly advantageously for this purpose.

In one particularly preferred embodiment, the measuring camera is provided with a connectable filter which can be used to protect said measuring camera against overloading by excessively high light intensities, such that the target point sighted by the camera can also be a cooperative target, such as e.g. a retroreflective prism.

The measuring camera can thus be used as a very accurate targeting aid, in a manner similar to a theodolite function, such that the surveying apparatus can also be calibrated very accurately in its theodolite-like function and in its scanning function, in particular with regard to targeting axis errors in the azimuthal direction and vertical axis direction, tilting axis skew, mirror errors and laser beam alignment (also see 2-position measurement further above), wherein here use can also be made of auxiliary means such as are known for theodolites.

With a surveying apparatus as described above in its various embodiments, it is possible in a simple manner to carry out a measuring method in which the surveying apparatus is aligned relative to the environment to be surveyed or the object to be surveyed with the aid of the measuring camera.

Following the accurate alignment of the surveying apparatus relative to the environment to be surveyed or the object to be surveyed with the aid of the measuring camera, a full surveying scan over said environment or said object can be carried out or else just a defined partial region thereof can be scanned. The alignment of the surveying apparatus with the aid of the measuring camera advantageously allows a more accurate positioning of the measuring apparatus.

As an alternative thereto, after the alignment of the surveying apparatus relative to the environment to be surveyed or the object to be surveyed with the aid of the measuring camera, the user sights individual points of the environment/object which represent corner points of the environment to be surveyed/object to be surveyed or of the projection area thereof and with the aid of which the boundaries of the space to be scanned can be defined. For each of the sighted points, the angular coordinates are determined or—this not being absolutely necessary, since the distance data are not necessarily required—an individual-point measurement is carried out, that is to say that the angular position and the distance to the target point are determined and the spatial coordinates of the target point, i.e. its position in space, are derived therefrom. Subsequently, only a space defined by the angular coordinates or the 3D coordinates of the individual-point measurements is surveyed by means of a surveying scan/fine scan. By virtue of this method, a coarse scan which is otherwise used for these purposes and which can last up to twenty minutes becomes superfluous and a desired spatial excerpt can be surveyed after a much shorter preparation time. For defining the object to be surveyed or the projection area thereof, it is possible to survey at least three points which span a projection area or, given corresponding programming, it is possible to survey two points which define a diagonal of a rectangular projection area, or it is also possible for an individual point to be sighted and determined in terms of its coordinates and for a fine scan then to be carried out proceeding from this one point in a surrounding circle around this point as determined by the user.

By virtue of the surveying apparatus construction according to the invention, photographic images can be captured by the measuring camera during the surveying scan, when the instants at which images are captured are coordinated with the field of view of the measuring camera and the rotational speed of the beam deflection unit about the rotation axis and the rotational speed of the measuring head about the base axis such that a panoramic image arises when the captured images are joined together. Consequently, a real-time panoramic recording of the scanned object/of the scanned environment is obtained and the time for an additional scan for capturing photographic images is saved. For this purpose, it is particularly advantageous to use a high-speed or high-resolution line camera as the measuring camera, in particular an RIM line camera.

Depending on the quality of the camera used and the purpose of use of the captured images, it may be the case that the image quality of the images captured during a scan is insufficient. The images can then be captured during a slow scan or by manual alignment of the field of view of the measuring camera integrated into the beam deflection unit.

In a further advantageous embodiment, the surveying apparatus can comprise a laser beam source, which emits laser light in the range visible to the camera and whose light is preferably emitted from the measuring apparatus into the environment in such a way that the impingement location can be observed by the measuring camera. In other words, the visible laser light is preferably emitted in the direction of the field of view of the measuring camera. For this purpose, the laser light visible to the camera can be coupled in for example coaxially with respect to the optical axis of the measuring camera in the optical path thereof, or can be emitted more simply and more cost-effectively in a parallel fashion with a real-defined, known offset with respect to the optical axis of the camera. In this case, the offset must only be of a magnitude such that the emitted laser beam is situated in the field of view of the measuring camera. If the laser beam and the impingement point thereof on an object are trackable or visible by means of the measuring camera, that is to say e.g. also representable on the display together with the photographic image captured by the camera, then a point of interest on an object can be sighted even more simply and more accurately. Sighting is possible even more accurately if a target marking such as a reticle, for example, can be superimposed on the image. The target point to be sighted can be stationary or movable.

In one particular embodiment, the laser beam source that emits laser light in the range visible to the measuring camera is identical with the radiation source that emits the measurement radiation for the distance measurement. For this purpose, the radiation source can emit as measurement radiation IR laser light, for example, which is guided by a fiber, such that an intermixing of the laser light occurs and the measurement radiation finally emitted contains proportionally IR light (approximately 90%) and white light (approximately 10%). The reflection radiation returning from the object is split according to white light component and IR component, wherein the IR component is filtered out by means of a filter or electronically and is forwarded to the detector for the distance measurement, while the white light component is captured by the camera. The emitted measurement radiation of the electronic distance measuring unit (EDM) can thus be used for the exposure of the concomitantly rotating camera. As already stated, for this purpose the camera has to be arranged in such a way that the emitted measurement radiation is situated in the field of view of the camera.

In one development of this embodiment, the concomitantly rotating camera which is situated in the rotation body and which observes the measurement radiation can be used to detect a drift between camera and measurement radiation.

In another further development of this embodiment, for each measurement point of the electronic distance measuring unit the camera captures a light point which reproduces the color and brightness of the measurement object at this point. As a result, as it were a color scan is made possible, which renders the previous image capture superfluous. However, since the laser light point that can be observed by the measuring camera is blurred at high rotational speeds on a camera CCD comprising a plurality of pixels, the color value for said light point is advantageously integrated over the entire sensor.

In one variant with respect to this embodiment, the camera can be configured as an HDR camera, such that a highly dynamic resolution with regard to brightness and/or color is possible.

Besides the above-described method for color determination by means of a white light component in the measurement radiation, it is also conceivable, of course, to use an RGB laser of the kind developed for mini projectors, for example, in an analogous manner for the color determination of an object. Moreover, the use of the following principles for color determination is also conceivable, e.g. Pin diode, spectral analysis by means of a prism or a grating with linear array, CCD, C-Mos, photodiode (array) and the like.

Another embodiment takes account of the fact that strictly speaking only a 1-pixel information item is required for each color measurement point. The previously required 2D camera sensor (area sensor) comprising many pixels is therefore replaced by a sensor comprising only few pixels or only one pixel and simplifies the camera optics, which saves costs.

In a further variant with respect to this embodiment, the collimator for the emission of the measurement radiation provided with the white light component is arranged alongside the camera in the rotation body, while the radiation source is situated in the housing and the laser light is forwarded to the collimator via a fiber. The fiber is led for example through a drive shaft connecting the rotation body to the motor, said drive shaft being embodied with a corresponding bushing duct. To compensate for the rotation, the fiber has a corresponding rotary coupling such as is familiar to the person skilled in the art.

Particularly advantageously, the deflection element at which the arriving reflection radiation is deflected in the direction of the detector has centrally an opening which is transparent to the measurement radiation and behind which the collimator is arranged. Alongside the collimator, the camera is arranged in the rotation body in such a way that its field of view is aligned in the same direction in which the measurement radiation is emitted into the environment by means of the collimator through the transparent opening of the deflection element, such that the white light component of the measurement radiation that is visible to the camera lies in the field of view of the camera and can be observed by the latter.

What is advantageous about the embodiment described above is that the reception path of the reflection radiation is shaded only to a small extent by the small transparent opening in the deflection element/rotary mirror. By virtue of the fact that the measurement radiation is no longer deflected via the deflection element on its way into the environment, the error that usually occurs twice on account of the deformation of the deflection element/rotary mirror occurs only once (reception path), and so said error is reduced. The negative influence of the deformation of the rotation body on the beam stability of the measurement radiation or reflection radiation is also halved and the intensity losses/laser losses are likewise reduced. Moreover, with such a construction, laser errors can be calibrated by means of 2-position measurement.

The negative influence of deformations of the rotation body (on account of unbalance and/or rotation-governed centrifugal forces) can be reduced further if the rotation body is embodied in a continuous fashion and is supported on one side on the shaft that drives the rotation body, and is supported on the opposite side e.g. by means of a ball bearing in the housing. A light path in the rotation body enables for the measurement radiation and reflection radiation the path to the deflection element and from the latter into the environment or to the detector and if necessary also of the incident light to the camera. Most simply, the rotation body is embodied as a hollow cylinder for this purpose.

Instead of the measurement radiation being provided with a white light component that is observable by the camera, it is also possible, however, to provide a laser light source separate from the radiation source of the measurement radiation and serving for the emission of the light visible to the measuring camera. Said laser light source either can itself be arranged alongside the camera in the rotation body of the beam deflection unit, wherein the energy transmission and the data exchange for the control of the laser light source, as in the case of the camera integrated into the rotation body, is effected capacitively, inductively, via sliding contact, etc. In a different variant, only the collimator for this laser light is arranged alongside the camera in the rotation body, analogously to the above-described arrangement for the measurement radiation, and emits the laser light visible to the measuring camera such that it reaches the field of view of the camera. In which case the collimator, analogously to the above description, is connected via a light-guiding fiber to the laser source, which is situated in the housing, for example.

In one particular embodiment, the laser light source that emits the laser light which is visible to the camera and is reflected by the object is part of a distance measuring device, wherein the measuring camera serves as a sensor of the distance measuring device, such that a distance measurement can be performed directly during the targeting of the object by means of the measuring camera. Since the distance between the laser light source of the laser beam visible to the measuring camera and the light-sensitive sensors of the measuring camera within the scanner is known, the distance measurement can be performed for example very simply and efficiently with the aid of the triangulation method. However, the distance measurement can also be effected according to the time-of-flight principle or the principle of the phase measurement principle.

The alignment of the surveying apparatus can also comprise a "free stationing". With the aid of the measuring camera, in a simple manner, reference points of a superordinate coordinate system can be sighted and their position relative to the surveying apparatus can be determined by means of individual-point measurement, i.e. by means of distance measurement and acquisition of the angular coordinates. The coordinates of the reference points of the superordinate coordinate system that are acquired in this way can then be used to determine the position and orientation of the surveying apparatus in the field as in the case of a theodolite, such that "free stationing", "forward and backward aiming" and "attachment to old points" are possible. A point cloud generated by the surveying apparatus can thus be referenced from the outset in the superordinate system.

On account of the low mass of the beam deflection unit with the integrated camera, the measuring camera can also be used as a "viewfinder". This can be used, for example, to set new points from the known location or for "stack out" application or so-called "targeting".

The camera and its control can advantageously be equipped with interactive image processing, which is particularly advantageously also provided with integrated pattern or image recognition (feature extraction).

The use of the measuring camera as a viewfinder can be manifested for example as follows: in a chemical plant, for example, a defined section of a specific pipeline, said section being defective, for example, is intended to be sought. The surveying apparatus is provided with image processing software, wherein the image processing software in this context includes pattern or image recognition. The coordinates of the section sought are known and are communicated to the surveying apparatus, embodied in particular as a scanner. The camera of the surveying apparatus, for the purpose of target tracking, is "shown" a significant recognition pattern, which can be for example an abstracted pattern, an image or a significant article, or an image or abstracted pattern of the article. The article can be e.g. in a known manner a retroreflector or better a tablet PC or an interactive smartphone or a significant corner thereof, or else a special recognition pattern or image which is generated on the display of these apparatuses and which is readily recognizable by the image processing software with its pattern or image recognition. The integrated pattern or image recognition program of the camera is activated and the pattern or image is stored as target object to be tracked. The scanner can therefore track the target object by means of its camera and send it to the desired location, wherein the solid angles of the tracked target object are known on account of the data of the angle encoders in rotation axis and base axis and are compared with the target coordinates constantly (continuously or discontinuously at specific time intervals). If the tracked target is a tablet PC or interactive smartphone, the direction instructions for seeking the target location can advantageously be communicated to this external apparatus, in the same way as a stop message, if the target (tablet PC/smartphone) tracked by the camera arrives at the coordinates of the target location.

Instead of a target location as target sought, it is also conceivable to predefine a movement path as target, on which the target object (reflector or smartphone, etc.) recognized by image recognition is intended to move. In this case, the movement path can be predefined in the form of 3D coordinates in space, wherein each 3D coordinate is assigned to an instant t1 to ti, such that the order in which the 3D coordinates are to be "run through" are defined by the successive instants t1 to ti.

Another possibility for using the camera as a viewfinder consists in communicating the recognition pattern of an object sought to the camera, wherein the recognition pattern can be an abstracted pattern of the object or a realistic imaging or a photographic imaging of the object. The image is captured as a reference image and stored by the image processing software or the pattern or image recognition of the scanner camera. Afterward, with the aid of the image processing software and its pattern or image recognition, the camera searches the environment for the object sought and, if the object has been found, finally after a target measurement (distance and angular coordinates) outputs the coordinates of the object sought for the user. Further applications can include, for example, in architecture, indicating the corner points of a window on a wall using visible laser light or, in the building trade, marking a drilled hole and comparable things.

If provision is made of a communication interface between tablet PC and/or smartphone, then the surveying apparatus and these external apparatuses can be configured by means of corresponding software such that the alignment and image capture of the measuring camera and/or the control of the scanning unit can be carried out via these external apparatuses.

The surveying apparatus presented here can advantageously be used for all these applications since the beam deflection unit with the integrated camera, on account of its low mass in comparison with a theodolite and since its field of view is aligned in the same direction as the measurement radiation, allows faster tracking than would be possible with a theodolite, and because, secondly, relative to a laser tracker, which has often been used hitherto for drilled hole markings and the like, it is constructed more precisely and more robustly, such that it is less susceptible to faults during applications outdoors and on construction sites.

BRIEF DESCRIPTION OF THE DRAWINGS

The device according to the invention and the method according to the invention are described in greater detail purely by way of example below on the basis of specific exemplary embodiments illustrated schematically in the drawings, further advantages of the invention also being discussed. Identical elements are identified by identical reference signs in the figures. In specific detail, purely schematically in the figures.

DETAILED DESCRIPTION

Figure 1:
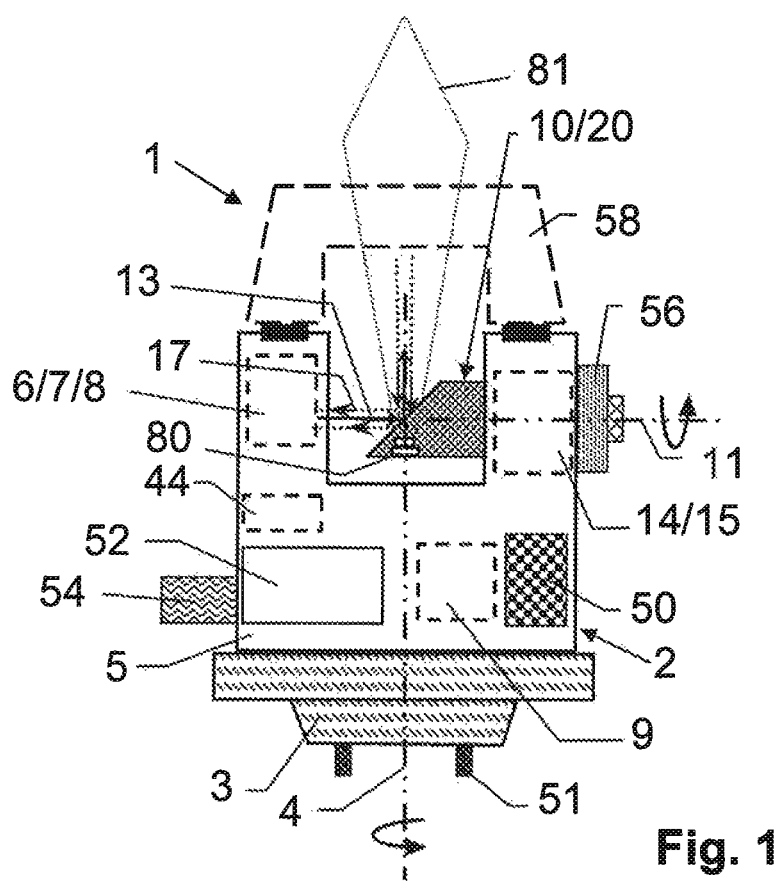
FIG. 1 shows a first embodiment of a surveying apparatus according to the invention without a stand.
Figure 2:
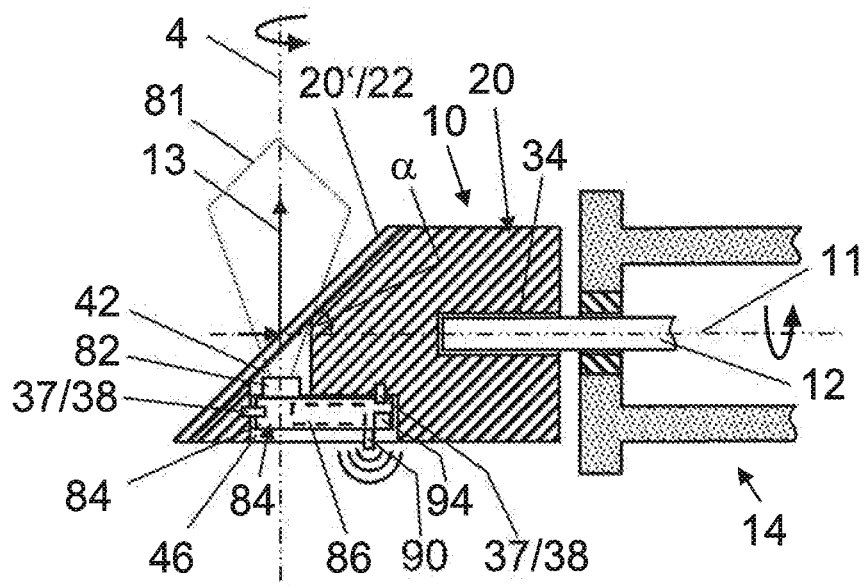
FIG. 2 shows the beam deflection unit according to the invention from the surveying apparatus according to the invention from FIG. 1 in sectional view.

FIG. 1 shows a first embodiment of a surveying apparatus 1 according to the invention, and FIG. 2 shows in detail with respect thereto a beam deflection unit 10 embodied according to the invention. The surveying apparatus 1 is equipped, as usual, with a measuring head 2, the housing 5 of which is mounted on a base 3 rotatably about a base axis 4. The base 3 can be fixed by means of an adapter 51 on a carrier or stand. The base 3 has a base axis 4, about which the housing 5 is rotatable—manually and/or in a motor-driven manner and in a manner controlled by a control unit 9. In the housing, provision is made of a radiation source 6 for generating measurement radiation 13 and a detector 8 for detecting captured reflection radiation 17, which is preferably reflected at a target object, and optical components 7 for beam guiding and collimation of the measurement and reflection radiation 13, 17. Radiation source 6 and detector 8 are part of an electronic distance measuring unit, also designated as EDM for short. On an opposite side of the housing 5 relative to the radiation source 6, the detector 8 and the optical components 7, a beam deflection unit 10 with a beam deflection element 22 (see FIG. 2) is supported in the housing 5, by means of which beam deflection unit the measurement radiation 13 is emitted into the environment in a controlled and aligned manner and the reflection radiation 17 is captured. For this purpose, the beam deflection unit 10 is mounted rotatably about a rotation axis 11, in a manner driven by a motor 15. The motor 15, for its part, is mounted in a motor housing 14 within the housing 5 of the measuring head 2. The present rotation angle at the two axes 4, 11 is acquired in each case by angle encoders arranged there and is communicated to the control unit 9.

The point of intersection of base axis 4 and rotation axis 11 generally corresponds to the impingement point of the focused measurement beam 13 on the deflection element 22. The deflection element 22 of the beam deflection unit 10 is inclined by an angle α relative to the rotation axis 11, said angle usually being 45°. Rotation of the measuring head 2 about the base axis 4 and rotation of the beam deflection unit 10 about the rotation axis 11 make it possible to carry out a three-dimensional scan. Laser beam source 6, detector 8, optical unit 7 and beam deflection unit 10 together with the corresponding parts of the computing and control unit 9 and the movement possibilities thereof about the base axis 4 and the rotation axis 11 form a scanning unit of the surveying apparatus 1.

In the example shown here, the beam deflection unit comprises a solid rotation body 20 composed of metal, the end side 20' of which is provided with a dichroic beam splitter as deflection element 22. Situated in the rotation body there is a cutout 46, in which a measuring camera 80 is fixed (see FIG. 2). By way of example, the measuring camera 80 illustrated here comprises a camera housing 84 and a camera optical unit 82 and is provided with a chargeable power source 86. Moreover, in accordance with this embodiment, it has a transmission unit 90 or a transmitter/transceiver for transmitting image data, measurement coordinates, control data (for example for triggering the camera) in order to communicate them e.g. to or from the internal processing and control unit 9 in the housing 5 or else from and to external apparatuses such as a remote control, a computer, a data logger, a tablet PC or a smartphone. In the example shown here, the transmission unit 90 is a switchable infrared and radio interface, but Bluetooth® or WiFi transmission would also be conceivable. Via a charging interface 94, which in this case is embodied as a socket for plugging in a charging cable, the power source 86 of the camera 80 can be charged when the beam deflection unit 10 is at a standstill. The measuring camera 80 integrated into the beam deflection unit 10 concomitantly rotates upon rotation of the beam deflection unit 10 about the rotation axis 11 thereof, wherein the cutout 46 in the rotation body 20 of the beam deflection unit 10 is arranged such that the measuring camera 80 with its field of view 81 is aligned coaxially in the same direction as the measurement beam or the measurement radiation 13. It therefore looks, as it were, coaxially in the same direction as the scanner.

The measuring camera can be used for capturing images of the object to be surveyed or else for aligning the measuring apparatus with a target object. For this purpose, the image information that the camera "sees" is imaged in real time on a display 52 (live image), wherein a reticle can optionally be superimposed. If, in addition, which is optionally possible, a laser light source is present, which emits laser light visible to the measuring camera (cf. FIG. 10), wherein the laser light is preferably emitted in the field of view range of the camera, the visible laser beam can also be tracked by the camera and a target can be sighted, very accurately in this way. The angular coordinates of the sighted target are already known from this sighting (angular position of the measuring camera). The distance of the target location can then be ascertained either by means of the scanning unit of the surveying apparatus or, if the laser light source of the laser light visible to the measuring camera is connected to a distance measuring unit or a correspondingly configured processing and control unit of the surveying apparatus, which is optionally possible, directly with the aid of the visible laser light, wherein particularly advantageously the measuring camera 80 is already used as a sensor or detector for the reflected laser light and for the distance measurement.

A first alignment of the measuring apparatus 1 with a target object in the horizontal direction can take place manually by means of rotation of the measuring head 2 about the base axis 4 by hand or by means of an adjusting rotary knob 54 that acts on an adjusting mechanism either directly or by means of a corresponding motorization (not illustrated). In an analogous manner, for the alignment with a target object, the beam deflection unit 10 with the deflection element 22 can be rotated about the rotation axis 11 manually by means of a second adjusting rotary knob 56 or in a motor-drive manner. The measurement radiation 13 can thus be aligned with a target very accurately in both manually and automatically controlled fashion by means of the motors connected to the respective drive shafts. In this example, an operating panel 50 is provided for manual inputs on the apparatus and makes it possible to change settings for sighting a target or aligning the surveying apparatus 1 and/or inputting or changing settings for capturing photographic images with the aid of the integrated measuring camera 80 and/or can serve for inputting additional data.

Furthermore, the surveying apparatus 1 has, for example, a handle 58 for simple transport of the apparatus 1, which handle is detachable from the measuring head 2 in a modular manner. For measurements or for capturing photographic images, the handle 58 can be detached in order to be able to cover the largest possible scanning region.

In the exemplary embodiment in accordance with FIG. 1, the measuring head 2 of the surveying apparatus 1 additionally has an inclination sensor 44 for measuring an inclination of the surveying apparatus 1 or of the measuring head 2 relative to the gravitational vector.

Figure 3:
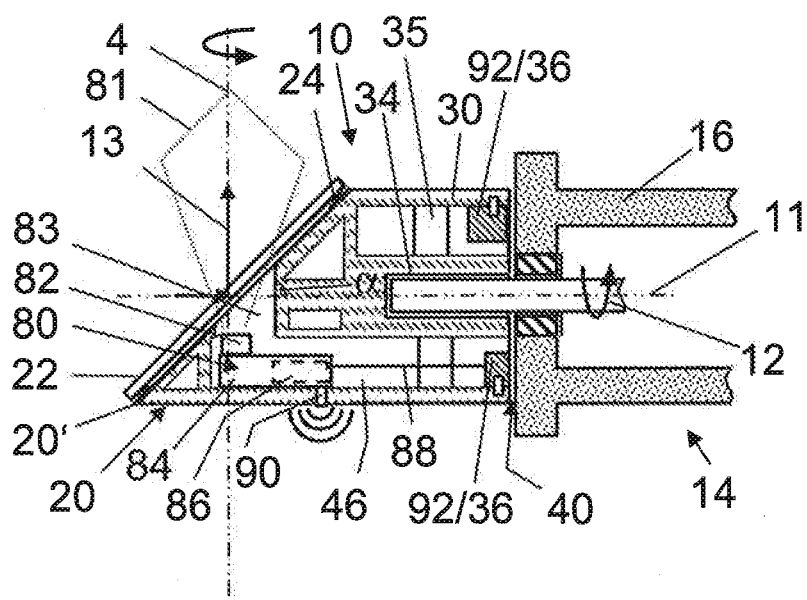
FIG. 3 shows, in an illustration identical to FIG. 2, an alternative embodiment of a beam deflection unit according to the invention.

FIG. 3 shows a configuration of a beam deflection unit 10 according to the invention that is similar to the exemplary embodiment in accordance with FIG. 2, wherein the rotation body 20 in this example consists not of solid metal but of a relatively lightweight plastic structure provided with cutouts (lightweight design). On the free, beveled end of the rotation body 20, there is arranged as deflection element 22 (preferably at an angle of inclination of 45° with respect to the two axes 4 and 11) in this example a dichroic glass or plastic mirror, which is fixedly connected to the end face 20' of the rotation body 20 by means of an adhesive-bonding connection 24. Parts of a cylinder wall 30 of the rotation body 20, which wall arises as a result of the plastic structure, are connected via supporting struts 35 to the inner, central part of the rotation body 20, this part receiving the shaft 12, as a result of which cutouts arise in the rotation body 20, which cutouts are accessible via an opposite end relative to the free end 20' of the rotation body 20. In this example, a measuring camera 80 is inserted into one of said cutouts 46 via the access described. Via a radial opening 83, the field of view 81 of the measuring camera 80 is directed into the environment coaxially and in the same direction with respect to the measurement radiation of the scanner. The lightweight construction is calculated and configured such that unbalance that would be caused by the camera is already compensated for by the lightweight construction.

Figure 4:
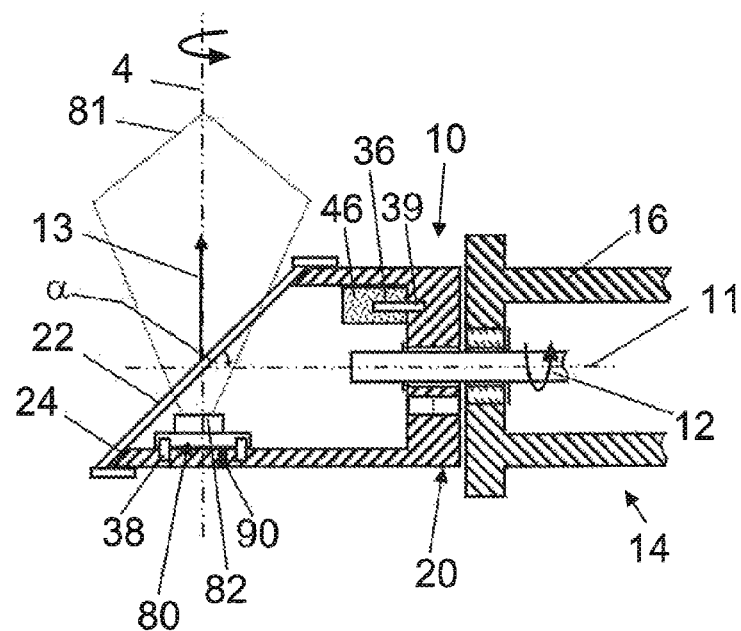
FIG. 4 shows a further embodiment of a beam deflection unit according to the invention.

The beam deflection unit 10 of the embodiment illustrated in FIG. 4 differs from the embodiment in accordance with FIGS. 2 and 3 in particular in that the rotation body 20 is embodied as an almost completely hollow cylinder beveled on one side, to be precise preferably composed of a lightweight metal such as aluminum. A cavity 46 encompassed by the cylinder extends as far as the free, beveled end 20' of the rotation body 20, wherein the dichroic beam splitter as deflection element 22 in this configurational form is connected to the rotation body 20 by adhesive-bonding connections 24 only at the end faces of the cylinder wall 30. The camera 80 is arranged with its lens 82 behind the dichroic beam splitter 22 in the cavity 46 of the cylinder, to be precise with the lens 82 and thus the field of view 81 once again coaxially in the same direction with the measurement beam 13 deflected into the environment at the beam splitter.

Figure 5:
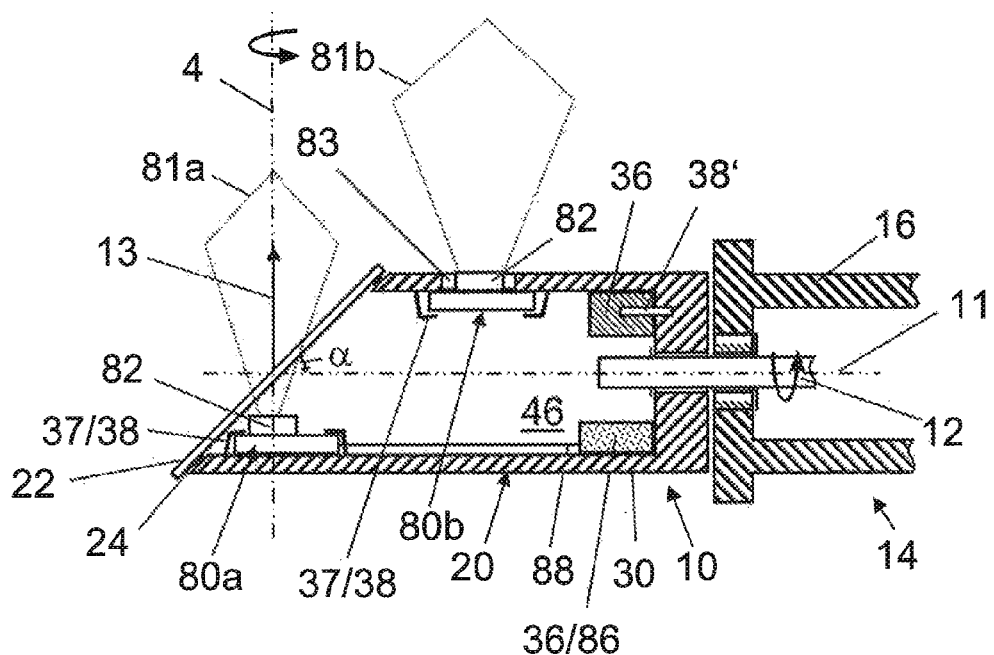
FIG. 5 shows yet another embodiment of a beam deflection unit according to the invention.

The embodiment illustrated in FIG. 5 substantially corresponds to that from FIG. 4, except that a further camera 80*b* is present alongside the camera 80*a* behind the dichroic beam splitter, the field of view 81*b* of said further camera being aligned with a lateral offset in the same direction as the measurement radiation 13. In this case, the measuring camera 80*a* can be embodied for example as a camera for near-field recordings and the measuring camera 80*b* can be embodied for example as a camera for far-field recordings. The cylinder wall 30 contains a radial opening 83 (also designated as a window) for accommodating the further camera 80*b* and aligning its field of view 81*b*. The cameras 80*a*, 80*b* are fixed with an accurate fit on the cylinder wall 30 of the rotation body 20 by means of holding elements 38. Likewise fixed on the cylinder wall 30 in the cavity 46 of the rotation body by means of fixing elements 38, a chargeable power source 86 is situated in the rotation body 20, and is connected to the measuring camera 80*a*8' via a power lead 88. The power source/battery 86 can optionally serve as a balancing element 36 at the same time. Alongside the power source 86 or instead of the latter, even further balancing elements 36 can likewise be fixed in the cavity 46 with the aid of fixing elements 38'. The mounting of the cameras 80*a*, 80*b*, the power source 86 and balancing elements 36, etc. is carried out before the mounting of the deflection element 22 from the free end 20' of the rotation body 20, preferably by the manufacturer of the rotation body 20.

Apart from the balancing elements 36 and the battery 86, which is fixed on the cylinder wall 30 by means of holding elements 38', for example, the interior between the deflection element 22, the cylinder wall 30 and the cylinder base of the rotation body 20 is empty in accordance with this illustrated embodiment, as a result of which the weight of the deflection element 10 is very low.

In an embodiment that is not illustrated, two radial openings 83 are provided in the cylinder wall 30, through which the field of view 81a, 81b of the two cameras 80a, 80b is directed into the environment with an offset in the same direction as the measurement beam 13. In this case, the openings 83 are made with a size such that the small lightweight cameras can be mounted through said openings 83. In this example, both measuring cameras 80a, 80b are fixed on the cylinder wall 30 by camera holders 37 configured in the form of holding clips 37'. The holding clips 37' disclosed allow a camera to be exchanged, if necessary e.g. in the case of a defect of a camera or if the requirements necessitate the use of a different camera. For the purpose of variability of the capture distance, at least one of the two measuring cameras in the above-described embodiment or in the embodiment described in FIG. 5 has a—more particularly digital—zoom. Of course, each of the two measuring cameras 80a and 80b can also be equipped with a digital or miniaturized, mechanical zoom for its capture distance range. The two measuring cameras 80a and 80b can also be cameras having different capture speeds, for example one camera having an average capture speed, while the other camera is embodied as a high-speed camera, for capturing for example more than 500 images per second, or one measuring camera 80a is a "normal" CC camera, while the other measuring camera 80b is a thermal imaging camera or a plenoptic camera.

Figure 6:
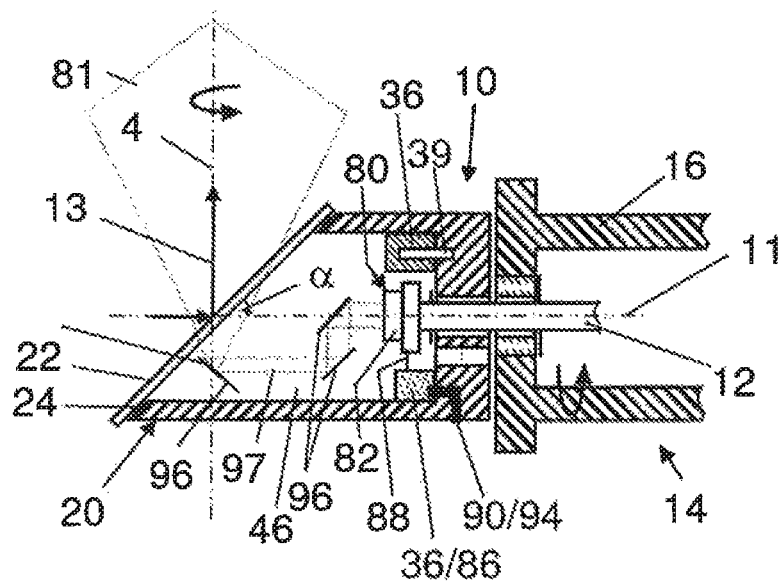
FIG. 6 shows yet another embodiment of a beam deflection unit according to the invention.

In the embodiment shown in FIG. 6, the rotation body 20 is again embodied as a hollow body. The beam deflection element 22 is once again embodied as partly reflective and partly transmissive. What are suitable for this purpose, in principle, are beam splitters which split light impinging on the optical deflection surface into transmission and reflection light in a predetermined ratio, for example also largely independently of the wavelength of the arriving light. It is preferred, further, for the beam deflection element to be embodied as a dichroic mirror 22 for this embodiment, which mirror deflects only light having the wavelength of the measurement radiation 13 and is transmissive to light having other wavelengths.

In this example, the measuring camera 80 is arranged axially with respect to the rotation axis 11 in the rotation body 20. By means of optical deflection elements 96 arranged in the cavity 46, the beam path 97 of the field of view 81 of the axially aligned lens 82 of the camera 80 is directed coaxially behind the beam splitter 22 and through the latter in the same direction as the measurement radiation 13 deflected into the environment at the beam splitter 22. In this case, the measuring camera 80 can be fixedly connected either directly to the shaft 12 or to the rotation body 20, such that it concomitantly rotates with the rotation axis 11. The structural space available in the axial direction as a result of the rotation body 20 embodied as a hollow body increases the flexibility with regard to the desired camera/camera optics, since in the case of a higher space requirement the length of the rotation body 20 can be adapted within a certain latitude, whereas an adaptation of the diameter of the rotation body 20 would be much more difficult and more complicated. Moreover, at this position the camera is more readily connectable to the spaces outside the rotation body with regard to energy supply and/or data transfer, for example via a bushing in the shaft 12 or a sliding contact.

Figure 7:
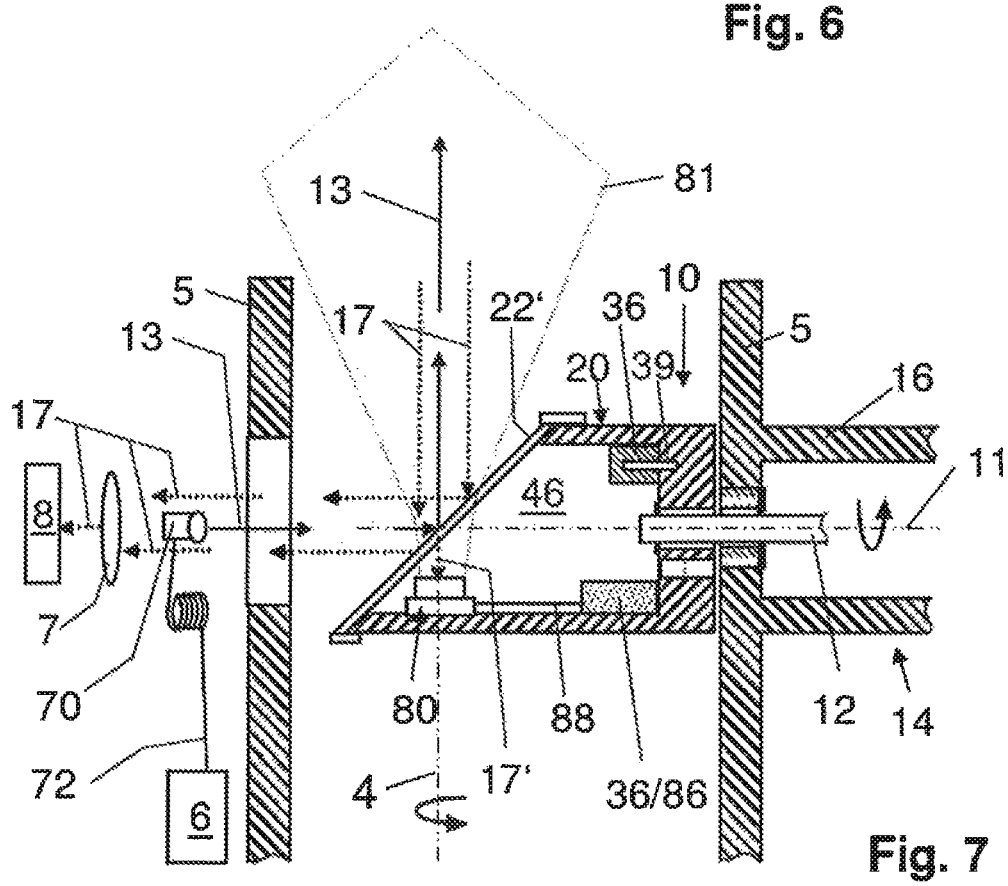
FIG. 7 shows yet another embodiment of a beam deflection unit according to the invention.
Figure 8:
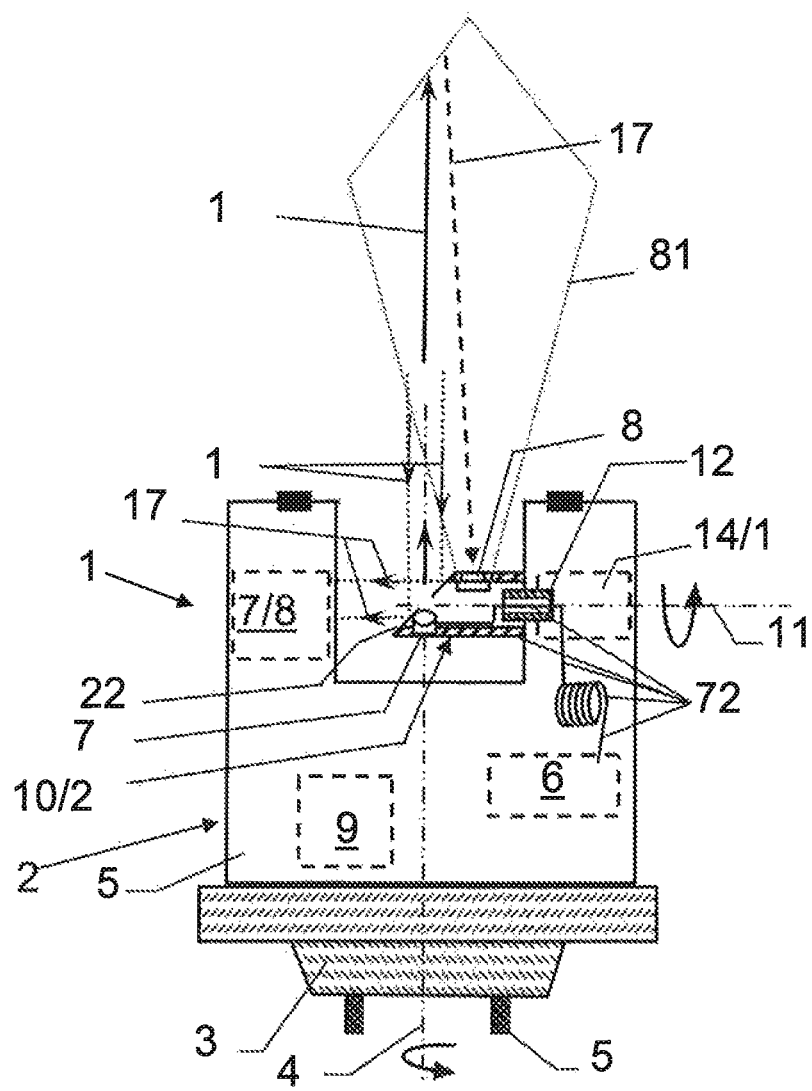
FIGS. 8 and 9 show two variants of a further embodiment of a surveying apparatus according to the invention in an illustration with parts of the housing.
Figure 9:
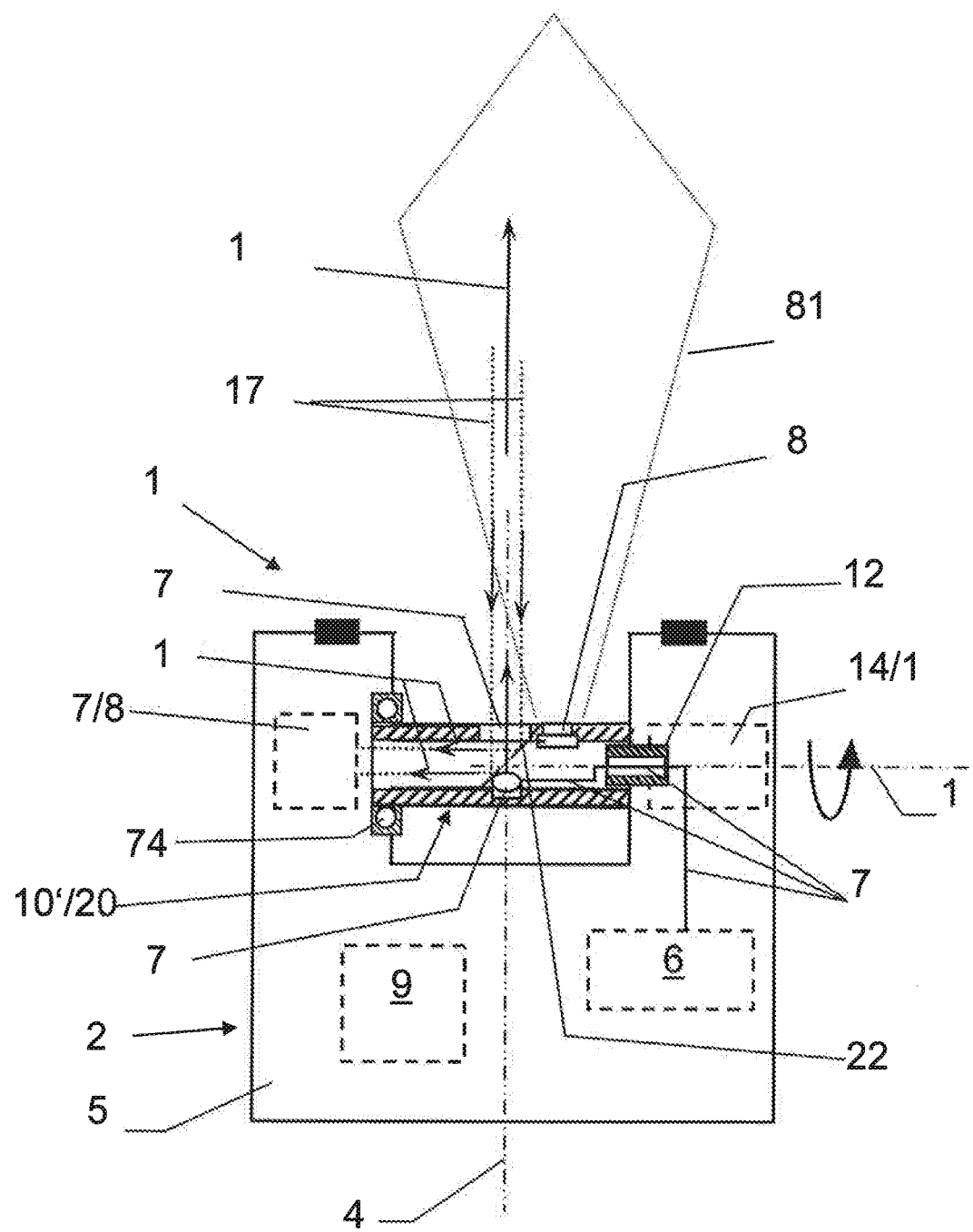

FIGS. 7 and 8 and 9 illustrate variants of a further advantageous embodiment of the surveying apparatus 1 according to the invention. In these variants, the radiation source 6 emits infrared laser light (IR laser light), which is guided to a collimator 70 via a light-guiding fiber 72. In the course of the IR laser light being guided through the fiber 72, the laser light is intermixed, such that the emitted measurement radiation 13 finally also contains a certain white light component (between 5% and 20%) alongside the IR laser light. The measurement radiation 13 including the white light component is reflected and captured as reflection radiation 17 by the surveying apparatus. The reflected IR laser light component 17 is guided onto the detector 8 in the housing 5 in the surveying apparatus for the purpose of distance determination, while the reflected white light component 17' is acquired by the measuring camera 80 and used e.g. for targeting of a desired target point and/or for color determination of the surface reflecting the white light 17'.

The variants in FIGS. 7, 8, 9 differ from one another in that, in the variant in FIG. 7, the radiation source 6 and the associated collimator 70 are arranged in the housing 5 of the measuring head 2 of the surveying apparatus 1 in the usual way. The measuring camera 80 is arranged in the rotation body 20 analogously to the example from FIG. 4. It is therefore aligned with its field of view 81 concentrically without an offset in the direction of the measurement radiation 13 emitted into the environment.

In the two variants in FIGS. 8 and 9 as well, the radiation source 6 is arranged in the housing 5, but, in contrast to the embodiment in FIG. 7, in the case of the variants in FIGS. 8 and 9, the collimator 70 is arranged in the rotation body 20, 20' of the beam deflection unit 10, 10'. In the examples shown here, the fiber 72 connecting the radiation source 6 to the collimator 70 is led through a continuous opening of the shaft 12', which drives the rotation body 10, 10' in terms of its rotation, and is led to the collimator 70 in the rotation body 20, 20'. For this purpose, the rotation body 20, 20' has a corresponding duct (not illustrated) or is embodied as a hollow cylinder, as illustrated in these examples. In order to compensate for the rotation, the fiber 72 is equipped with one or more (as necessary) rotary couplings (not illustrated). The collimator 70 is arranged in each case on the rear side of a deflection element 22, 22', which is embodied either as a dichroic mirror 22 (cf. FIG. 7) or as a mirror 22' having an opening transparent at least to the measurement radiation 13 including white light above the collimator 70 (see FIG. 8), such that the measurement radiation 13 can be emitted into the environment straightforwardly in a directional manner by means of the beam deflection unit 10, 10' and the captured reflection radiation 17, as in the other examples, can also be forwarded via the deflection element 22' and corresponding optical elements 7 to the detector 8 in the housing 5 of the surveying apparatus 1.

In contrast to the variant from FIG. 7, in the variants in Examples 8 and 9 the measuring camera 80 is arranged in the rotation body 20, 20' in such a way that its field of view is aligned with a well-defined, known lateral offset but likewise without rotation or with a rotation of 0° relative to the measurement radiation 13.

The two embodiments in FIGS. 8 and 9 differ from one another in that the rotation body 20 of the beam deflection unit 10 in FIG. 8, as usual, is supported on one side by the shaft 12', which drives the rotation body 20 in terms of its rotation, while the opposite side of the rotation body 20 forms a free end that is beveled in a customary manner and carries the deflection element 22. In contrast thereto, in the example in FIG. 11, the rotation body 20' is embodied as a continuous hollow cylinder which, on one side thereof, is once again carried by the driving shaft 12' but on the opposite side is mounted rotatably by means of a ball bearing 74 in the housing 5 of the measuring head 2 of the surveying apparatus 1. Measurement errors arising as a result of deformations or bending moments of the rotation body can largely be avoided in this way. Approximately in the center of the rotation body 20', an opening 78 is introduced into the hollow cylinder and a deflection element 22 is introduced underneath in a corresponding angular position with respect to the rotation axis. The opening 78 together with the deflection element 22 allows the emergence of the measurement radiation 13 and the capture of the reflection radiation 17 (indicated by dotted lines). The cavity of the rotation body 20' on that side supported by means of ball bearing 74 serves as a path for the reflection radiation 17 from the deflection element 22 toward the detector 8 in the housing 5. It goes without saying that the housing must have a corresponding opening which can then preferably also accommodate the ball bearing. As an alternative thereto, the photosensitive sensor of the camera can also be embodied such that it can detect the measurement radiation, with the result that the camera, alongside its task of generating photographic images, at the same time is also part of the distance measuring device as a detector. The distance measurement can then e.g. advantageously be performed according to the triangulation measurement principle (cf. dashed line 17*b*).

Figure 10:
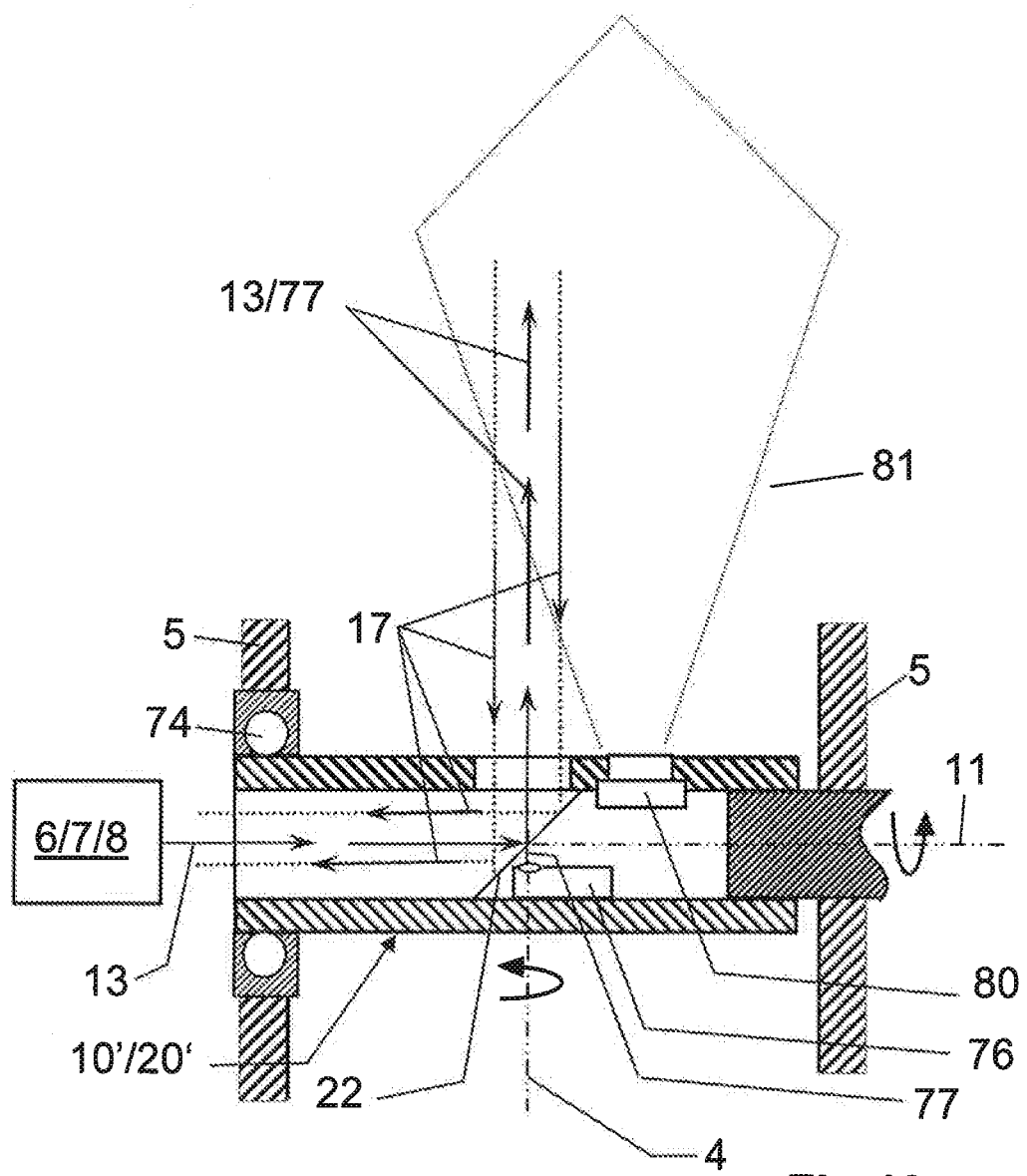
FIG. 10 shows yet another embodiment of a beam deflection unit according to the invention.

The embodiment illustrated in FIG. 10 likewise has a continuous rotation body 20' which on one side is supported by the driven shaft 12 and on the opposite side is mounted rotatably by means of ball bearings 74 in the housing 5. This embodiment is also otherwise constructed, in principle, in the same way as the example from FIG. 9. In contrast to the embodiment in FIG. 9, however, here the radiation source 6 that emits the measurement radiation 13 is arranged in the housing 5 of the measuring head in the usual way, as also described for the examples in FIGS. 2 to 8. Alongside said radiation source 6 for the measurement radiation 13 in the housing 5, in this embodiment, a separate laser light source 76 is also provided in the rotation body 10', said laser light source emitting laser light 77 visible to the measuring camera 80. Said laser light source 76 is arranged analogously to the collimator 70 in FIG. 9, the deflection element 22 being configured as a dichroic mirror likewise analogously to the embodiment in FIG. 9. The measuring camera 80 is once again arranged in the rotation body 20' such that its field of view 81 is aligned with a lateral offset in the direction of the emitted measurement radiation 13, such that the laser light 77 from the laser light source 76 that is visible to the measuring camera 80 lies in the field of view 81 thereof. An opening 78 in the rotation body once again allows the capture of the reflection radiation 17 and the emergence of the measurement radiation 13 deflected at the deflection element 22. The cavity of the rotation body on that side supported by means of ball bearings 74 serves as a path for the measurement radiation and the reflection radiation toward and respectively away from the deflection element 22.

It is readily apparent to the person skilled in the art that not only the embodiments shown in FIGS. 9 and 10 can have a continuous rotation body 20', moreover this design can also be used expediently for many further embodiments; by way of example, also for those embodiments from FIGS. 3 to 8.

As evident from the above description, particular advantages of the measuring apparatus according to the invention are thus the simpler and more robust construction; the point measurements now possible, the punctiform sighting of targets or emission of a marking laser beam in the light range visible to the measuring camera, which can be tracked by the measuring camera, and the resultant simplified targeting and marking of desired points with simultaneous distance measurements; real-time applications which are possible, in comparison with the theodolites, on account of the low mass of the beam deflection unit provided with the measuring camera and the resultant fast tracking capability of the measuring camera and are allowed by the use of the measuring camera as a recording apparatus for films/video clips or as a viewfinder/tracker; the simple tracking and finding of targets for predefined target coordinates or with the aid of image recognition and control via smartphone, tablet PC joystick, etc.; the simpler and more accurate 2-position measurement that enables a more precise calibration of the measuring camera and of the laser beam, and connection measurements allowing free stationing of the surveying apparatus.

The person skilled in the art knows in what way details of the embodiments described above and applications of the invention can be combined with one another within the scope of the claims, even though not all combinations were able to be presented here for reasons of space.

What is claimed is:

1. A surveying apparatus comprising:
    a housing mounted on a base that is rotatable about a base axis;
    a radiation source accommodated in the housing and serving for generating the measurement radiation;
    a beam optical unit accommodated in the housing and serving for guiding the measurement radiation out of the housing and forwarding reflection radiation reflected from the environment by a scanned object onto a detector situated in the housing, wherein measurement radiation and reflection radiation at least partly have a common optical path;
    a beam deflection unit located in the common optical path and mounted in the housing rotatably about a rotation axis and serving for the adjustable, directional emission of the measurement radiation into the environment and for capturing the reflection radiation from the environment;
    a measuring camera integrated into a rotation body of the beam deflection unit and concomitantly rotating with the beam deflection unit upon a rotational movement of the beam deflection unit about its rotation axis and serving for capturing photographic images of the environment to be scanned or the scanned environment; and
    a processing and control unit for data and image processing and for control of the surveying apparatus, wherein the measuring camera, which has a field of view, is equipped and arranged in the rotation unit in such a way that its field of view is aligned in the same direction as the measurement radiation emitted into the environment by a beam deflection element of the beam deflection unit.

2. The surveying apparatus according to claim 1, wherein the field of view of the measuring camera is aligned with a lateral offset in the same direction as the measurement radiation emitted into the environment by the beam deflection element of the beam deflection unit.

3. The surveying apparatus according to claim 1, wherein the measuring camera is arranged in the rotation body on the rear side of the beam deflection element and the beam deflection element is embodied as a dichroic beam splitter which deflects substantially only the wavelength of the measurement radiation and is transparent to other wavelengths, and wherein the field of view of the measuring camera is aligned either with a slight lateral offset or coaxially in the same direction as the measurement radiation emitted into the environment by the beam deflection element of the beam deflection unit.

4. The surveying apparatus according to claim 1, wherein a laser light source is provided, which generates laser light visible to the measuring camera, wherein the laser light of said laser light source is emittable into the environment in a manner aligned in the direction of the field of view of the measuring camera in such a way that the visible laser light is trackable by the measuring camera.

5. The surveying apparatus according to claim 4, wherein the laser light source that generates laser light visible to the measuring camera is part of a distance measuring device that allows the determination of the distance between the surveying apparatus and an object that reflects the visible laser light, and the measuring camera serves as a sensor of the distance measuring device for the light distance measurement by means of the laser light visible to the measuring camera.

6. The surveying apparatus according to claim 5, wherein the distance measuring device is a distance measuring device based on the triangulation principle.

7. The surveying apparatus according to claim 5, wherein the distance measuring device is a distance measuring device based on the time-of-flight principle or the phase shift.

8. A method comprising:
optically surveying by scanning emission of measurement radiation with a surveying apparatus, wherein the surveying apparatus is aligned using an individual-point measuring mode, wherein in the individual-point measuring mode;
sighting a target point with the aid of the measuring camera
automatically acquiring angular coordinates of the target point; and
automatically determining the distance to the target point using the measurement radiation aligned in the same direction as the field of view of the measuring camera and the spatial coordinates of the target point are automatically derived from these data, namely the angular coordinates and the distance, wherein a two-position measurement is carried out before the optical surveying of the environment by means of the measuring camera looking in each case in the direction of the emitted measurement radiation and errors of the measuring camera in the horizontal collimation and in the vertical index are determined in an automated manner by means of the two-position measurement and an automated determination of the rotation axis skew is optionally also carried out and the measuring camera is calibrated with respect to the axial system of the measuring instrument and, in addition, the position of the laser beam of the scanning unit in relation to the axial system is optionally calibrated with the measuring camera already calibrated.

9. A method comprising:
optically surveying by scanning emission of measurement radiation with a surveying apparatus, wherein the surveying apparatus is aligned using an individual-point measuring mode, wherein in the individual-point measuring mode;
sighting a target point with the aid of the measuring camera
automatically acquiring angular coordinates of the target point; and
automatically determining the distance to the target point using the measurement radiation aligned in the same direction as the field of view of the measuring camera and the spatial coordinates of the target point are automatically derived from these data, namely the angular coordinates and the distance, wherein during the surveying, scan photographic images are captured by the measuring camera, wherein the capture speed at which images are captured is coordinated with the field of view of the measuring camera and the rotational speed of the beam deflection unit about the rotation axis and/or the rotational speed of the housing about the base axis such that a panoramic image arises when the captured images are joined together, wherein an RIM line camera is used as the measuring camera.

10. A method comprising:
optically surveying by scanning emission of measurement radiation with a surveying apparatus, wherein the surveying apparatus is aligned using an individual-point measuring mode, wherein in the individual-point measuring mode;
sighting a target point with the aid of the measuring camera
automatically acquiring angular coordinates of the target point; and
automatically determining the distance to the target point using the measurement radiation aligned in the same direction as the field of view of the measuring camera and the spatial coordinates of the target point are automatically derived from these data, namely the angular coordinates and the distance, wherein the surveying apparatus has a transmission unit for receiving and communicating data and image processing software with pattern or image recognition, and for the alignment of the surveying apparatus
a recognition pattern of an object sought is communicated to the measuring camera, the recognition pattern of the object is acquired by the image processing software as reference and is stored,
by means of rotation of the measuring camera about the rotation axis and rotation about the base axis and with the aid of the image processing software and the recognition pattern stored as reference by the image processing software, the environment is searched for the object sought and, if the object sought has been found, the spatial coordinates of the object sought are generated by means of an acquisition of the distance and of the angular coordinates and are output for the user.

11. A method comprising:
optically surveying by scanning emission of measurement radiation with a surveying apparatus, wherein the surveying apparatus is aligned using an individual-point measuring mode, wherein in the individual-point measuring mode;
sighting a target point with the aid of the measuring camera
automatically acquiring angular coordinates of the target point; and
automatically determining the distance to the target point using the measurement radiation aligned in the same direction as the field of view of the measuring camera and the spatial coordinates of the target point are automatically derived from these data, namely the angular coordinates and the distance, wherein:
the surveying apparatus has a transmission unit for receiving and communicating data and image processing software, and for the alignment of the surveying apparatus coordinates of a target sought are communicated to the surveying apparatus and are stored by the latter, wherein the target is a target location, that is to say a stationary target, or a movement path defined by its spatial coordinates succeeding one another temporally at instants $t_1$ to $t_i$;

a target object to be tracked is sighted as a target point and photographed by means of the measuring camera and the photograph is stored by means of the image processing software as a reference image for the recognition and tracking of the target object by means of the measuring camera;

the actual coordinates of the target object to be tracked are determined and are compared with the coordinates of the target sought (target location or spatial coordinates of the movement path) and, in a manner derived therefrom, a movement instruction is generated and output, with the aid of which the target object to be tracked is directed in the direction of the target, wherein the measuring camera, with the aid of the image processing software and the reference image, recognizes its target object to be tracked and tracks the movement thereof, and wherein the actual coordinates of the target object to be tracked are constantly acquired and compared with the coordinates of the target and the movement instruction are correspondingly adapted, and in that in the case where the actual coordinates of the target object to be tracked correspond to the coordinates of the target, a success message is output.

12. The surveying apparatus according to claim 1, wherein the surveying apparatus comprises a scanner for optically surveying an environment by scanning emission of measurement radiation.

13. The surveying apparatus according to claim 5, wherein the measuring camera is an EDM camera.

* * * * *